No. 618,996. Patented Feb. 7, 1899.
J. M. E. RIEDEL & O. F. J. GRAHL.
FUNNEL.
(Application filed Mar. 7, 1898.)
(No Model.)
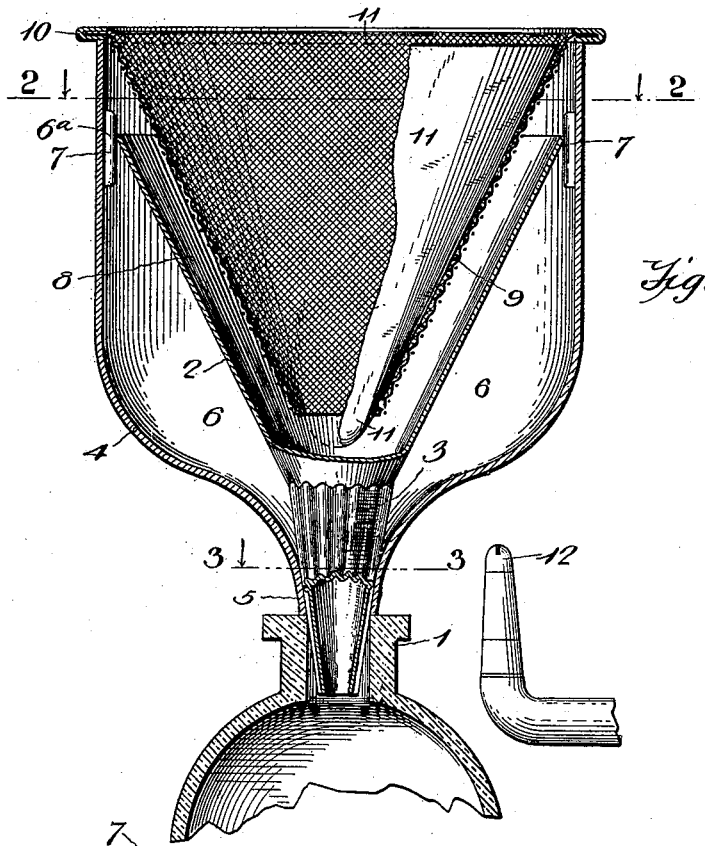
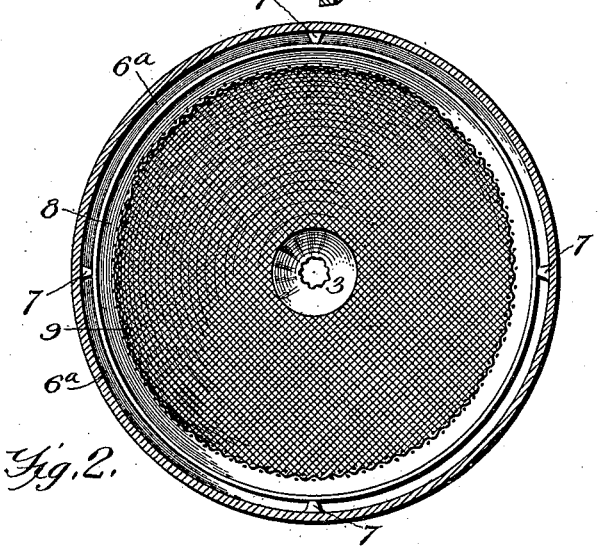
John M. E. Riedel and
Otto F. J. Grahl, Inventors
Witnesses
By Their Attorneys,

UNITED STATES PATENT OFFICE.

JOHN M. E. RIEDEL AND OTTO F. J. GRAHL, OF FORT WAYNE, INDIANA.

FUNNEL.

SPECIFICATION forming part of Letters Patent No. 618,996, dated February 7, 1899.

Application filed March 7, 1898. Serial No. 672,919. (No model.)

*To all whom it may concern:*

Be it known that we, JOHN M. E. RIEDEL and OTTO F. J. GRAHL, citizens of the United States, residing at Fort Wayne, in the county of Allen and State of Indiana, have invented a new and useful Funnel, of which the following is a specification.

The present method of filtering liquids as practiced by pharmacists and others in which a layer of paper is used as the filtering medium on the inside of an ordinary funnel is very slow. As soon as the paper becomes thoroughly soaked with the liquid it flattens out and lies closely against the flaring walls of the funnel, thereby preventing the liquid from flowing freely between the funnel and the filtering medium. As the funnel-body is contracted at its lower end to join with the spout and as the paper has a tendency to slip into the spout, the latter is liable to become choked and the free passage of the liquid is interrupted. In our improved construction we aim to produce a funnel in which these objections are overcome by constructing and arranging the parts to retain the filtering layer or medium properly in place against the structure, while providing for the uninterrupted flow of the filtered liquid and the ready outlet or free escape of air from the vessel into which the filtered liquid is delivered and contained.

Our filter is designed more particularly for the filtration of such heavy thick liquids as syrups, oils, and the like, which do not flow freely, although the improvement may be used for filtration purposes generally, and the improved filter may be used advantageously in connection with means for externally heating the funnel and the liquid to facilitate the flow of the latter.

With these ends in view our invention consists in the novel combination of elements and in the construction and arrangement of parts, which will be hereinafter described and claimed.

To enable others to understand our invention, we have illustrated the same in the accompanying drawings, forming a part of this specification, and in which—

Figure 1 is a sectional elevation of a filtering-funnel embodying our improvements. Fig. 2 is a horizontal sectional plan view on the plane indicated by the dotted line 2 2 of Fig. 1. Fig. 3 is a similar sectional plan view on the plane indicated by the dotted line 3 3 of Fig. 1.

Like numerals of reference denote like and corresponding parts in each of the several figures of the drawings.

In Fig. 1 of the drawings we have shown the improved filtering-funnel as fitted to the neck 1 of any suitable receptacle merely for the purpose of illustrating the application and mode of using the improved funnel; but it will of course be understood that the vessel or its neck has no connection with the invention.

2 designates a funnel within an outer shell 4 and receiving within itself a foraminous cone 9, that sustains the filtering layer 11 in proper relation to the funnel for the purpose of permitting free and uninterrupted flow of the filtered liquid through the funnel into the vessel, while the air displaced from the vessel by the ingress of the liquid has free escape between the funnel and the external shell 4. We have shown the funnel 2 as consisting of a flaring body and a contracted, corrugated, or ribbed spout 3; but we do not strictly confine ourselves to this particular type of funnel, because we are aware that equivalent devices may be used in lieu thereof.

The external shell 4 is cylindrical for the major portion of its length; but the bottom part of said shell is curved inwardly and contracted to produce the nipple 5. This nipple is adapted to fit around the corrugated or ribbed spout 3 of the funnel; but the diameter of the nipple is greater than the extremity of said spout for the purpose of having the spout of the funnel project through the external shell. Such construction and arrangement of the shell with relation to the spout provides for the proper seating of the snell-nipple around the funnel-spout, while the spout enters the neck of the vessel and the edge of the nipple 5 is adapted to rest upon said neck 1, as shown by Fig. 1, whereby the funnel fits in the vessel to sustain the entire filter in proper position on said vessel. The cylindrical and converged shape of the external vessel provides an enlarged air space or chamber between the flared body and upper part of the spout of the funnel and said external shell, and the described arrangement of the contracted nipple around the ribbed spout forms a plurality of air-channels between said spout and nipple, through which channels the air escaping from the vessel may flow into the chamber 6 between the funnel and the external shell.

The cylindrical body of the external shell projects a suitable distance above the upper edge of the flared funnel-body; but this edge of the funnel-body does not have direct contact with the inner face of the cylindrical part of the shell, because such contact or arrangement of the funnel with the shell would tend to close the upper end of the chamber 6 against the free egress of the outflowing current of air. To overcome this objection, we provide a series of lugs or projections 7 on the inner surface of the cylindrical shell 4 and at a suitable distance below the upper open end of said shell. These lugs or projections occupy substantially the same horizontal plane within the cylindrical shell, and against said lugs are fitted the external or circumferential edge of the flared funnel-body. These lugs are suitably spaced apart and they hold the funnel from contact with the inner surface of the shell, thereby forming openings or spaces $6^a$ from the chamber 6, through which openings or spaces the air is free to escape from said chamber 6 between the funnel and the external shell.

The foraminous cone 9 is suspended within the flared body of the funnel; but said cone is seated upon the upper edge of the cylindrical shell 4 to be held thereby out of contact with the funnel-body. In fact, said cone is in parallel relation substantially to the funnel to provide between said cone and the funnel the continuous space 8, which provides for the free and uninterrupted flow of the filtered liquid through the funnel and its spout into the vessel. The cone 9 is preferably constructed of wire fabric, although it may be made of perforated sheet metal, and said cone is provided at its upper edge with an external offstanding flange 10, which spans the space between the flaring wall of the cone and the shell, so that the flange rests upon the upper edge of said shell 4, thus suspending the cone within the shell and the funnel-body. The layer of filtering-paper or other media 11 is placed within the foraminous cone, and the lower extremity of said filtering material or layer may project through the opening at the lower extremity of said cone 9.

In using our improved device the funnel proper, 2, is fitted within the external shell to have its ribbed spout protrude through the contracted nipple 5 at the lower extremity of said shell, while the upper edge of said funnel is seated against the lugs or projections 7 within the shell. The parts may now be placed on the vessel by having the protruding end of the funnel-spout fit in the neck of the vessel, while the nipple is seated upon the vessel-neck. The foraminous cone having been provided with the layer of filtering material, such as the ordinary paper used in the art, the cone is placed in position so as to project into the funnel and have its external flange fit upon the edge of the shell 4. The material to be filtered may now be poured into the layer of filtering material 11 within the cone, and such liquid is free to percolate through the filtering material and flow into the space 8 between the cone and the funnel. The funnel and its spout conduct the liquid into the vessel, and the air displaced in the vessel by the ingress of the liquid flows freely and uninterruptedly through the vent-channels between the nipple and the spout into the enlarged chamber 6 and through the outlet or vent-openings $6^a$.

From the foregoing description it will be seen that we have provided an improved construction of filtering-funnel in which a novel form of external shell is provided to receive a common type of funnel in a way to secure uninterrupted egress of air from a storage vessel. The foraminous cone is suspended within the shell and funnel to allow for the free flow of the filtered liquid by gravity through the funnel into the vessel, and said cone holds the filtering material from contact with the shell and the funnel, thereby allowing the liquid after percolation through the filtering material to flow into and through the funnel. The parts are readily separable for the purpose of cleaning the same, and the cone may be withdrawn from the shell to remove the filtering material therein without disturbing the funnel within the shell, if desired.

As before indicated, our construction of filtering-funnel is especially designed for the filtration of such heavy liquids as syrups, oils, and the like, and when such liquids are to be treated we find it advantageous to employ means for heating the liquid before and during filtration, thereby liquefying the liquid and causing it to filter more rapidly than it would if not heated. One means for heating the liquid consists in the employment of a heating-burner 12, situated in close relation to the contracted bottom of the external shell. This burner may consist simply of a gas-burner designed to be connected by a flexible tube or hose to a gas-fixture, and said burner 12 is positioned outside of the shell to direct its flame or jet against the shell to heat the latter and the funnel sufficiently to in a measure increase the liquefaction of the syrup or oil, and thereby facilitate its filtration and passage through the filtering medium and the funnel into the vessel.

It is evident that changes in the form and proportion of parts may be made by a skilled mechanic without departing from the spirit or sacrificing the advantages of the invention.

Having thus described the invention, what we claim is—

1. The combination with a funnel, of an external shell fitted to the spout and body of the funnel to provide air-spaces between the funnel and said shell, and a filter-carrying cone suspended from the shell within the funnel and out of contact therewith, substantially as described.

2. The combination with a funnel, of an external shell provided at its lower end with a nipple to fit the funnel-spout, a cone suspended from the shell within the funnel, and a filtering medium confined within said cone, substantially as described.

3. The combination with a funnel, of an external shell fitted to the funnel-spout and provided at a point below its open upper end with a series of seats against which the edge of the funnel-body is fitted, a foraminous cone suspended from the shell within the funnel and a filtering medium confined within said cone from contact with said funnel, substantially as described.

4. The combination with a funnel, of an external shell provided at its lower extremity with a nipple to fit the funnel-spout and within itself with a series of inwardly-projecting ledges to receive the edge of the funnel-body, a foraminous cone provided at its upper end with an external flange which is fitted to the edge of the shell and suspends said cone within the funnel free from contact therewith, and a layer of filtering material confined within said foraminous cone, substantially as described.

5. The combination with a funnel, of an external shell fitted thereto to provide an uninterrupted air-space and vents between said funnel and the shell, a suspended foraminous cone within the shell and funnel and free from contact therewith, to form a space between the funnel and cone, and a layer of filtering material confined within said cone, substantially as described.

6. The combination of an external shell, a funnel fitted within said shell to provide for the circulation of air therethrough, and a foraminous cone suspended within the funnel, substantially as described.

7. The combination of an external shell, a funnel suspended in the shell to leave air-circulation spaces between itself and the shell, and a foraminous cone suspended on the shell independently of the funnel and arranged within said funnel but free from contact therewith, substantially as described.

In testimony that we claim the foregoing as our own we have hereto affixed our signatures in the presence of witnesses.

JOHN M. E. RIEDEL.
OTTO F. J. GRAHL.

Witnesses for John M. E. Riedel:
B. J. ELLERT,
PAUL F. KUHNE.

Witnesses for O. F. J. Grahl:
W. J. F. PIEPENBRINK,
CHRIST BUHLER.